US012638567B2

(12) United States Patent
Haag et al.

(10) Patent No.: US 12,638,567 B2
(45) Date of Patent: May 26, 2026

(54) METHOD FOR DETERMINING A FUNCTION STATE OF AN ULTRASONIC SENSOR FOR A VEHICLE

(71) Applicant: VALEO SCHALTER UND SENSOREN GMBH, Bietigheim-Bissingen (DE)

(72) Inventors: Fabian Haag, Bietigheim-Bissingen (DE); Jose Renan Veliz Argueta, Bietigheim-Bissingen (DE); Thomas Frintz, Bietigheim-Bissingen (DE); Paul Bou-Saleh, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 191 days.

(21) Appl. No.: 18/562,330

(22) PCT Filed: May 10, 2022

(86) PCT No.: PCT/EP2022/062524
§ 371 (c)(1),
(2) Date: Nov. 19, 2023

(87) PCT Pub. No.: WO2022/243090
PCT Pub. Date: Nov. 24, 2022

(65) Prior Publication Data
US 2024/0230869 A1 Jul. 11, 2024

(30) Foreign Application Priority Data
May 19, 2021 (DE) ..................... 10 2021 112 996.6

(51) Int. Cl.
*G01S 15/931* (2020.01)
*G01S 7/52* (2006.01)

(52) U.S. Cl.
CPC ........ *G01S 7/52004* (2013.01); *G01S 15/931* (2013.01); *G01S 2007/52009* (2013.01)

(58) Field of Classification Search
CPC ............... G01S 15/931; G01S 7/52004; G01S 2007/52009; B04C 5/04
See application file for complete search history.

(56) References Cited

U.S. PATENT DOCUMENTS 5,991,234 A * 11/1999 Sejalon ................. B06B 1/0246
367/13
10,163,447 B2 * 12/2018 Krishnan ................ G10L 19/02
(Continued)

FOREIGN PATENT DOCUMENTS

DE 102017105043 A1 9/2018
DE 102017128837 A1 6/2019
(Continued)

OTHER PUBLICATIONS

Office Action issued in counterpart Japanese Patent Application No. 2023-571738 mailed Sep. 6, 2024 (8 pages).
(Continued)

*Primary Examiner* — Daniel L Murphy
*Assistant Examiner* — Amie M Ndure
(74) *Attorney, Agent, or Firm* — Osha Bergman Watanabe & Burton LLP

(57) ABSTRACT

Method for determining a function state (FZ) of an ultrasonic sensor (2) for a vehicle (1), having the steps of: a) applying (S1) an electrical test signal (P) to the ultrasonic sensor (2); b) detecting (S2) an electrical response signal (A) from the ultrasonic sensor (2); c) determining (S3) a phase-frequency response (PF) comprising the phase angle ($\alpha$) of the detected response signal (A) for the applied test signal (P) on the basis of an excitation frequency (f) of the applied test signal (P); d) comparing (S4) at least a first phase angle
(Continued)

(P1) below and a second phase angle (P2) above a resonant frequency (R) in the determined phase-frequency response (PF) with a respective expected phase angle (PE1, PE2); e) correcting (S5) the determined phase-frequency response (PF) on the basis of the comparison; and f) determining (S6) the function state (FZ) on the basis of the corrected phase-frequency response (PFK).

13 Claims, 4 Drawing Sheets

(56)                References Cited

U.S. PATENT DOCUMENTS

| | | | | |
|---|---|---|---|---|
| 10,521,977 | B2 * | 12/2019 | Pitt | G07C 5/08 |
| 10,678,240 | B2 * | 6/2020 | Pollach | G06V 20/56 |
| 11,163,048 | B2 * | 11/2021 | Suchy | G01S 7/52004 |
| 11,338,816 | B2 * | 5/2022 | Dudar | B60W 50/00 |
| 11,520,027 | B2 * | 12/2022 | Suchy | G01S 15/931 |
| 2007/0035203 | A1 | 2/2007 | Bromfield | |
| 2015/0170662 | A1 * | 6/2015 | Krishnan | G10L 19/08 |
| | | | | 704/205 |
| 2016/0262608 | A1 * | 9/2016 | Krueger | G16H 40/63 |
| 2018/0276910 | A1 * | 9/2018 | Pitt | G01B 11/14 |
| 2018/0320645 | A1 | 11/2018 | McQuillen et al. | |
| 2020/0072955 | A1 | 3/2020 | Haag | |
| 2020/0400803 | A1 | 12/2020 | Suchy et al. | |
| 2021/0345939 | A1 * | 11/2021 | Jumbe | H04R 1/028 |
| 2023/0384264 | A1 * | 11/2023 | Jardine | B64D 45/00 |
| 2024/0015445 | A1 * | 1/2024 | Schuh | H04R 9/08 |

FOREIGN PATENT DOCUMENTS

| | | | |
|---|---|---|---|
| DE | 102018124024 | A1 | 4/2020 |
| JP | H07-151788 | A | 6/1995 |
| JP | H10-503445 | A | 3/1998 |
| JP | 2019-023011 | A | 2/2019 |

OTHER PUBLICATIONS

Office Action issued in counterpart Japanese Patent Application No. 2023-571738 mailed Jul. 12, 2024 (12 pages).
Office Action Issued in Corresponding KR Application No. 2023-7039631, dated Jul. 29, 2025 (23 Pages with English Translation).
International Search Report issued in corresponding German Patent Application No. DE 10 2021 112 996.6 dated Feb. 3, 2022 (5 pages).
International Search Report issued in corresponding International Application No. PCT/EP2022/062524 dated Sep. 15, 2022 (7 pages).
Written Opinion issued in corresponding International Application No. PCT/EP2022/062524 dated Sep. 15, 2022 (6 pages).

* cited by examiner

METHOD FOR DETERMINING A FUNCTION STATE OF AN ULTRASONIC SENSOR FOR A VEHICLE

The present invention relates to a method for determining a functional state of an ultrasonic sensor for a vehicle, a computer program product, a device, and a vehicle.

Ultrasonic sensors on motor vehicles are designed in some cases for measuring the distances of objects. In ultrasonic sensors, in particular an electro-acoustic energy conversion takes place. Irrespective of the physical principle of this energy conversion, which, among other things, can be mechanical-inductive, mechanical-capacitive, mechanical-restrictive, magnetic-restrictive or electrostrictive in nature, for any energy converting element the possibility exists of being exposed to internally or externally induced changes, which depending on their magnitude can give rise to a falsification of the measurement result or a complete sensor failure.

DE 10 2017 105 043 A1 describes a method in which an electrical test signal is generated and applied to an ultrasonic sensor, wherein at least one electrical characteristic parameter of the ultrasonic sensor affected by the electrical test signal is evaluated. Depending on this evaluation, a transfer function of the ultrasonic sensor is determined, which is compared with a reference transfer function. Depending on the comparison, the functional state of the ultrasonic sensor is determined. In particular, it is provided that the transfer function is determined by means of the impedance frequency response, wherein the impedance frequency response 14 describes the electrical characteristic parameter K, in particular as the current and/or voltage as a function of the phase angle α between the two.

Against this background, an object of the present invention is to provide an improved method for determining a functional state of an ultrasonic sensor for a vehicle.

According to a first aspect, a method for determining a functional state of an ultrasonic sensor for a vehicle is provided, which comprises the following steps:

a) applying an electrical test signal (P) to the ultrasonic sensor (5a);

b) detecting an electrical response signal from the ultrasonic sensor;

c) determining a phase-frequency response comprising the phase angle of the detected response signal for the applied test signal as a function of an excitation frequency of the applied test signal;

d) comparing at least a first phase angle (P1) below and a second phase angle above a resonant frequency in the determined phase-frequency response with a respective expected phase angle;

e) correcting the determined phase-frequency response on the basis of the comparison; and f) determining the functional state on the basis of the corrected phase-frequency response.

Ultrasonic sensors that are based on the resonance principle have a characteristic profile of the phase angle between the test and response signal. Another finding is that the phase angle is less strongly influenced by transient effects than other electrical characteristic parameters, such as voltage amplitude. Advantageously, transient effects in the phase-frequency response can be compensated by means of the proposed method, so that a functional state of the ultrasonic sensor can be determined even more reliably.

The functional state is, for example, a degree of contamination or icing of a diaphragm of the ultrasonic sensor or an aging-related change in the stiffness of the diaphragm. In general, the functional state can relate to any change in the mechanical properties of the ultrasonic sensor due to aging or otherwise.

The ultrasonic sensor preferably comprises a diaphragm, a sound transducer element (in particular a piezoelectric element) for vibration excitation and vibration detection of the diaphragm, and a control and evaluation unit (in particular a microprocessor, e.g. ASIC), which is configured to actuate the sound transducer element for vibration excitation and vibration detection.

The vehicle may be a motor vehicle, in particular a passenger car or a truck.

For example, the test signal is a harmonic signal, a step signal, a chirp signal, or a pulse signal. The applied test signal and detected response signal are preferably selected such that they do not contain an echo signal.

Preferably, the applied test signal comprises an electrical current and the detected response signal an electrical voltage; however, this situation can also be reversed.

For example, the phase-frequency response may include an interval from $-pi/2$ to $+pi/2$.

The first and second phase angle or the frequencies underlying them in the test signal are selected in such a way that transient effects relating to them can be essentially eliminated. This means that even if transient effects occur around the resonance frequency, they have no or only negligible effect on the first and second phase angles. Thus, the first and second phase angles allow an undistorted comparison with the expected phase angle in each case (because transient effects can be suppressed). The expected phase angle is preferably stored on a data memory of the ultrasonic sensor or of the vehicle.

In particular, the correction comprises a linear shift of the determined phase-frequency response. The correction can relate to individual or all data points of the phase-frequency response.

According to one embodiment, the first and second phase angles are spaced from the resonance frequency by at least 20%, 30% or 40% of the resonance frequency.

In other words, the frequencies of the test signal at which the first and second phase angles are detected are located in an interval of 0 to [resonance frequency minus 20% to 40%×resonance frequency] and [resonance frequency plus 20% to 40%×resonance frequency] to infinity. The inventors have found that no or negligible transient effects occur at extreme frequencies selected with these values. That is, at the extreme frequencies, the behavior of the ultrasonic sensor corresponds to its stationary (i.e., steady) state. The expected phase angle also corresponds to the steady state. This results in good comparability. In addition, the correction factor determined from this comparison is reliable and can also be used to apply a correction at sampling points between the first and second phase angles as described below.

According to one embodiment, in step e) the first and second phase angles of the determined phase frequency response are corrected to the respective expected phase angle.

This means that the first and second phase angles are each mapped onto the expected phase angle.

According to one embodiment, step e) comprises the correction of the determined phase-frequency response at sampling points between the first and second phase angles.

In the mapping of the first and second phase angles to the expected phase angles, a correction factor is determined. The correction at the sampling points is applied as a function of this correction factor. The phase-frequency response is normally affected by transient effects at the sampling points. Nevertheless, the stationary (steady-state) component in the signal can be reliably corrected using the correction factor.

According to a further embodiment, the correction carried out at the first and second phase angle and/or the sampling points is affine-linear.

This allows for improved correction results.

According to a further embodiment, in step f) parameters of a state model of the ultrasonic sensor are determined using the corrected phase-frequency response, wherein the functional state is determined on the basis of a comparison between the determined and expected parameters.

The state model is preferably a purely stationary model of the ultrasonic sensor. This means that transient effects are not taken into account. Such models or the corresponding parameters can be calculated rapidly. The expected parameters are stored on a data memory of the ultrasonic sensor or of the vehicle. The parameters can be representative of, for example, a mechanical inertia, stiffness or viscosity of the ultrasonic sensor or of its individual components.

According to one embodiment, the respective expected phase angle and/or the expected parameters are determined using a simulation model or a reference sensor.

The simulation model can be generated in particular in a Computer Aided Design (CAD) program. In particular, the simulation model can simulate the mechanical and/or thermodynamic behavior of the ultrasonic sensor.

According to one embodiment, the steps a) to f) are carried out at the end of a production line in which the vehicle comprising the ultrasonic sensor is manufactured, and/or at or immediately after each starting of the vehicle.

The production line refers to the production line of a vehicle manufacturer. "Starting of the vehicle" means activating the functions necessary for driving operation, in particular switching on the ignition in the case of a vehicle with an internal combustion engine.

According to one embodiment, the ultrasonic sensor is operated as a function of the determined functional state.

For example, the vibration excitation of the sound transducer element takes place depending on the determined functional state. In addition or alternatively, how the evaluation unit evaluates the vibrations detected by means of the sound transducer element depends on the determined functional state. For example, the distance detection or distance calculation for an ice-affected ultrasonic sensor (functional state: ultrasonic sensor affected by ice) is carried out in a different way compared to a non-ice-affected state.

According to one embodiment, the state model has a first capacitor, a first inductor and a first resistor, which are connected in series with each other, and a second capacitor, a second inductor and a second resistor, which are connected in parallel.

This provides an accurate state model.

According to one embodiment, in step f), the correction is applied without the use of an amplitude-frequency response.

The amplitude-frequency response is comparatively susceptible to unwanted transient effects, which can therefore be advantageously eliminated.

According to one embodiment, in step f) the functional state is determined on the basis of the corrected phase-frequency response and a detected temperature of the ultrasonic sensor or a vehicle environment.

By including the temperature in the determination of the functional state, the result becomes even more accurate.

The respective "unit" (e.g. the control and evaluation unit or the excitation unit referred to below) may be implemented in hardware and/or software. In the case of an implementation in hardware, the respective unit may be in the form of a computer or a microprocessor, for example. In the case of an implementation in software, the respective unit may be in the form of a computer program product, a function, a routine, an algorithm, part of a program code, or an executable object. Furthermore, each of the units mentioned here may also be in the form of part of a superordinate control system of the vehicle, such as a central control system and/or an ECU (Engine Control Unit).

A second aspect proposes a computer program product comprising instructions that, when the program is executed by a computer, cause said computer to perform the method described above.

A computer program product, such as a computer program means, may be provided or delivered, for example, as a storage medium such as a memory card, a USB stick, a CD-ROM, a DVD, or in the form of a downloadable file from a server in a network. This may take place for example in a wireless communication network by transmitting a corresponding file containing the computer program product or the computer program means.

According to a third aspect, a device for determining a functional state of an ultrasonic sensor for a vehicle is provided. This device comprises:

an excitation unit for applying an electrical test signal to an ultrasonic sensor of the vehicle;

a detection unit for detecting an electrical response signal from the ultrasonic sensor;

a determining unit for determining a phase-frequency response comprising the phase angle of the detected response signal for the applied test signal as a function of an excitation frequency of the applied test signal;

a comparison unit for comparing at least a first phase angle below and a second phase angle above a resonant frequency in the determined phase-frequency response with a respective expected phase angle;

a correction unit for correcting the determined phase-frequency response using the comparison; and a determining unit for determining the functional state on the basis of the corrected phase-frequency response.

According to a fourth aspect, a motor vehicle having a device as described above is proposed.

The embodiments and features proposed for the first aspect apply mutatis mutandis to the further aspects, and vice versa.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred embodiments with reference to the accompanying figures.

Identical or functionally identical elements have been provided with the same reference signs in the figures, unless stated otherwise.

Figure 1:
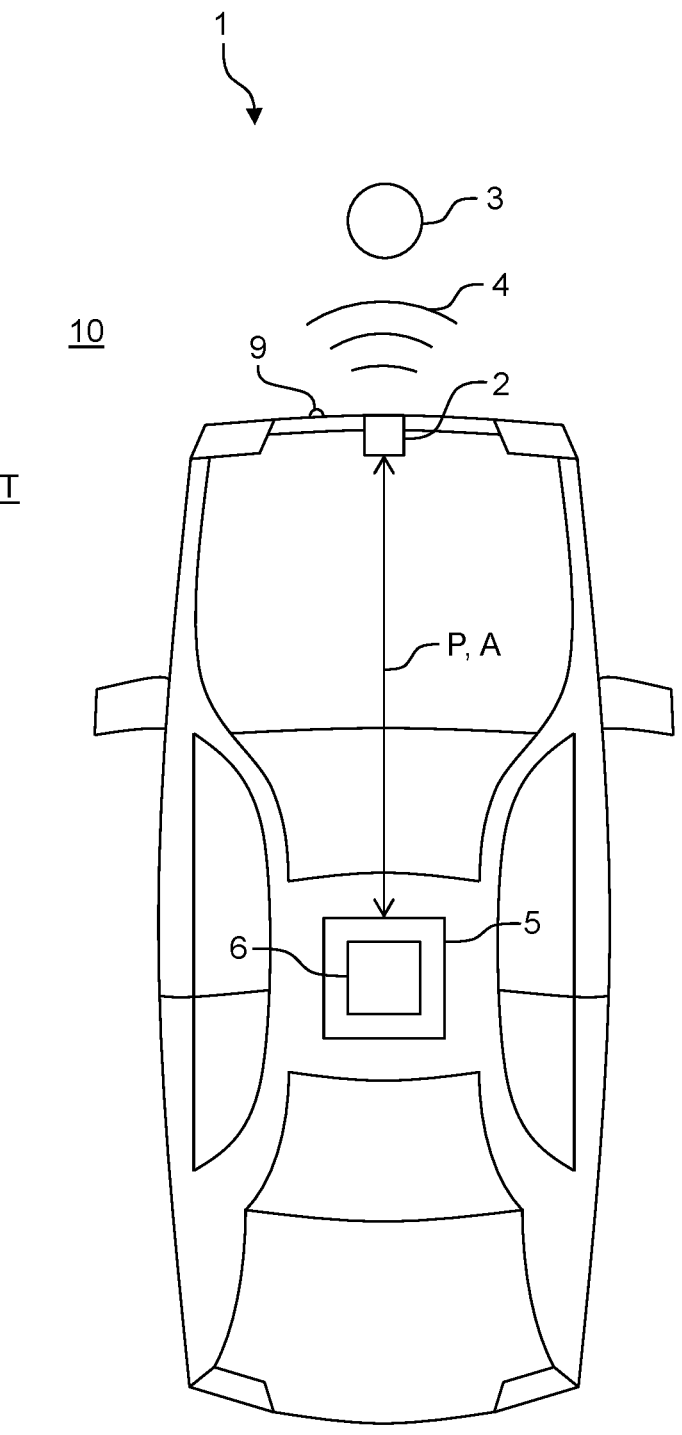
FIG. 1 shows a plan view of a motor vehicle having an ultrasonic sensor in accordance with one embodiment.

FIG. 1 shows a vehicle 1, which is designed, for example, in the form of a passenger car. The vehicle 1 comprises an ultrasonic sensor 2, which may be part of a driver assistance system, not shown in detail, and is used in particular to measure a distance of the vehicle 1 to an object 3. For this purpose, the ultrasonic sensor 2 emits ultrasonic waves 4, which are reflected by the object 3 and received by the ultrasonic sensor 2 again. On the basis of the transmitted and received ultrasonic waves 4, the ultrasonic sensor 2 generates measurement data, which it transmits to a central vehicle control unit 5 (also known as an "Electronic Control Unit"—ECU for short). This can be carried out via the vehicle databus.

Due to environmental influences, aging or other effects, the measurement data may change. This influence must be input into the distance measurement in order to make it as accurate as possible, even in the light of these factors.

Accordingly, a functional state of the ultrasonic sensor 2 is determined—preferably at regular intervals, for example during the manufacture of the vehicle 1 at the end of the production line and then at or after each vehicle start, i.e. after the on-board network is switched on. This functional state can be, for example, "sensor affected by ice" or "piezoelectric element aged". In general, the functional state can consist of a characterization of the ultrasonic sensor 2 or a part thereof in comparison to a real reference sensor (here empirical values are acquired and compared) or a simulation model (here, in the context of a simulation, e.g. using a CAD computer program, values are calculated and compared).

For this purpose, a device 6 is provided on the vehicle control unit 5 or at any other point in the vehicle 1. The device 6 is illustrated in more detail in FIG. 2 and can be implemented as hardware and/or software on the vehicle control unit 5. Alternatively, the device 6 and the ultrasonic sensor 2 may be formed in a common housing and/or at least partially on the same printed circuit board (PCB) and/or at least partially on the same microchip (not shown in each case).

The device 6 comprises an excitation unit 61, which is designed to apply an electrical test signal P to the ultrasonic sensor 2, in particular to its sound transducer element (not shown). This corresponds to a method step S1 illustrated in FIG. 5.

The sound transducer element is, for example, a piezoelectric element. The transducer element actuates the diaphragm of the ultrasonic element 2 to generate vibration based on the test signal P. The test signal P comprises in particular a time-dependent profile of the current amplitude, e.g. in the form of a chirp.

Figure 4:
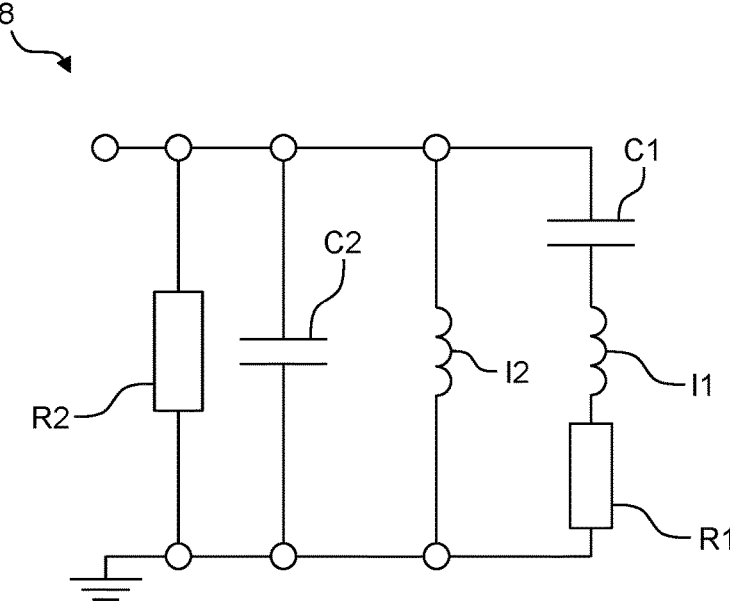
FIG. 4 shows an equivalent circuit diagram in accordance with one embodiment.
Figure 5:
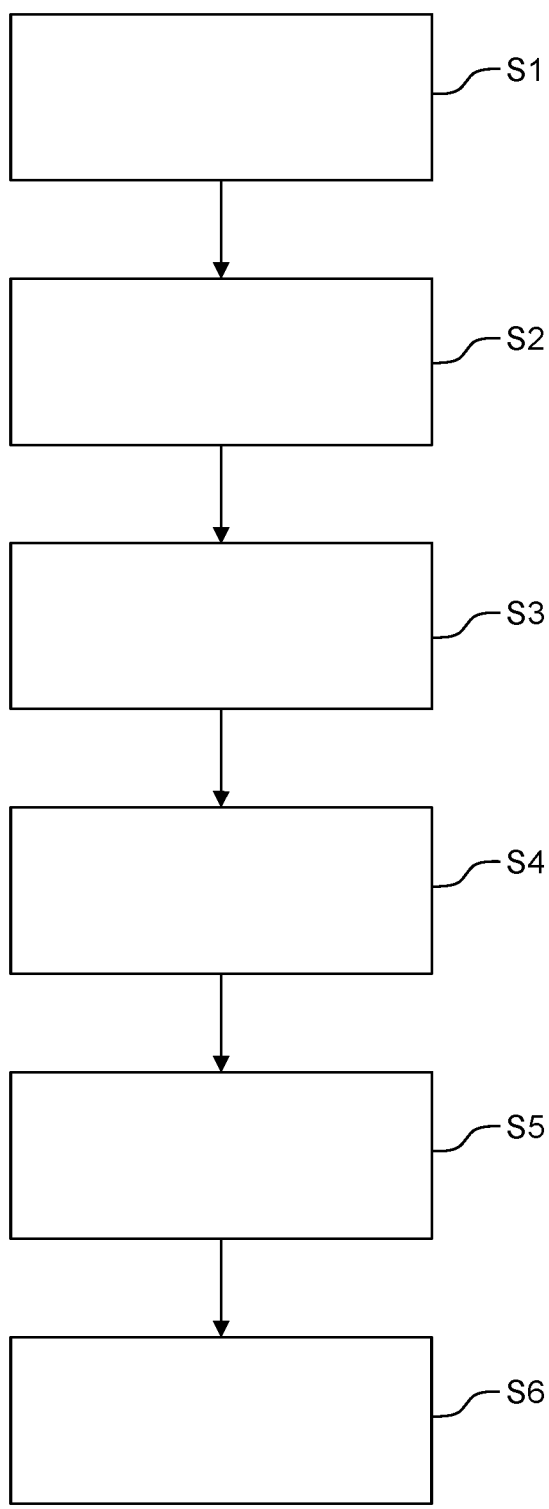
FIG. 5 shows a flowchart in accordance with one embodiment.

Essentially simultaneously with method step S1, a detection unit 62 of the device 6 detects the response signal A (FIGS. 2 and 4) of the ultrasonic sensor 2, see also method step S2 in FIG. 5. According to the exemplary embodiment, this consists in a detected voltage, which is dropped across the ultrasonic sensor 2, in particular its sound transducer element.

In addition, the device 6 comprises a determining unit 63. This is designed to determine, in step S3 (FIG. 5), the phase-frequency response PF, which is shown in a dash-dotted line in FIG. 3. This means that the relative phase angle (angle $\alpha$ in degrees, ordinate in FIG. 3) in the test signal P and response signal A is determined, namely as a function of the frequency of the test signal P (also referred to here as "excitation frequency"—f in kHz, abscissa of FIG.

3). The excitation frequency comprises an interval which includes the resonance frequency R (FIG. 3) of the ultrasonic sensor 2, in particular of its diaphragm and sound transducer element. In the exemplary embodiment, the resonance frequency R is 52 kHz, the limits of the excitation interval (also referred to in this case as "extreme frequencies" Eu and Eo) are 30 kHz (Eu) as the lower limit and 90 kHz (Eo) as the upper limit. At the lower extreme frequency Eu (e.g. 30 kHz) the phase-frequency response has a first phase angle P1, at the upper extreme frequency Eo a second phase angle P2. The first and second phase angles P1, P2 and the extreme frequencies underlying them are advantageously spaced from the resonance frequency R by 40% of its value. In this case, the distance to the extreme frequencies Eu and Eo is 22 kHz and 38 kHz, respectively, which are both greater than 52 kHz×40%=20.8 kHz. Advantageously, the proportion of transient effects in the phase-frequency response at these extreme frequencies is low. The amplitude-frequency response, because it is much more sensitive to transients, is advantageously not even detected, but in any case not evaluated.

A comparison unit 64 of the device 6 reads a first expected phase angle PE1 and a second expected phase angle PE2 from a data memory 7, which is likewise provided, for example, in the vehicle control unit 5. The first and second phase angles PE1, PE2 are preferably al-ready determined during the development of the ultrasonic sensor 2, or at least before its initial operation in the vehicle 1 for distance measurement. For example, these angles can be calculated using a CAD or other simulation model or measured in a trial using a reference sensor.

The comparison unit 64 then compares, in a method step S4, the first phase angle P1 with the first expected phase angle PE1 and the second phase angle P2 with the second expected phase angle PE2 and calculates a comparison result.

In a method step S5, a correction unit 65 (FIG. 2) corrects the detected phase-frequency response PF based on the comparison result. According to the exemplary embodiment, an affine-linear transformation is determined, which maps the first phase angle P1 onto the first expected phase angle PE1 and the second phase angle P2 onto the second expected phase angle PE2. Based on this transformation (also referred to here as a correction factor), the phase-frequency response PF is also corrected proportionally at further sampling points S between the extreme frequencies Eu and Eo in an affine-linear manner according to their position (i.e. frequency). For the sake of simplicity, only one such sampling point is shown in FIG. 3. The phase angle PS at the frequency S is mapped onto the corrected phase angle PSK. After correction at a plurality of further sampling points (not shown), the corrected phase-frequency response PFK is obtained.

Figure 2:
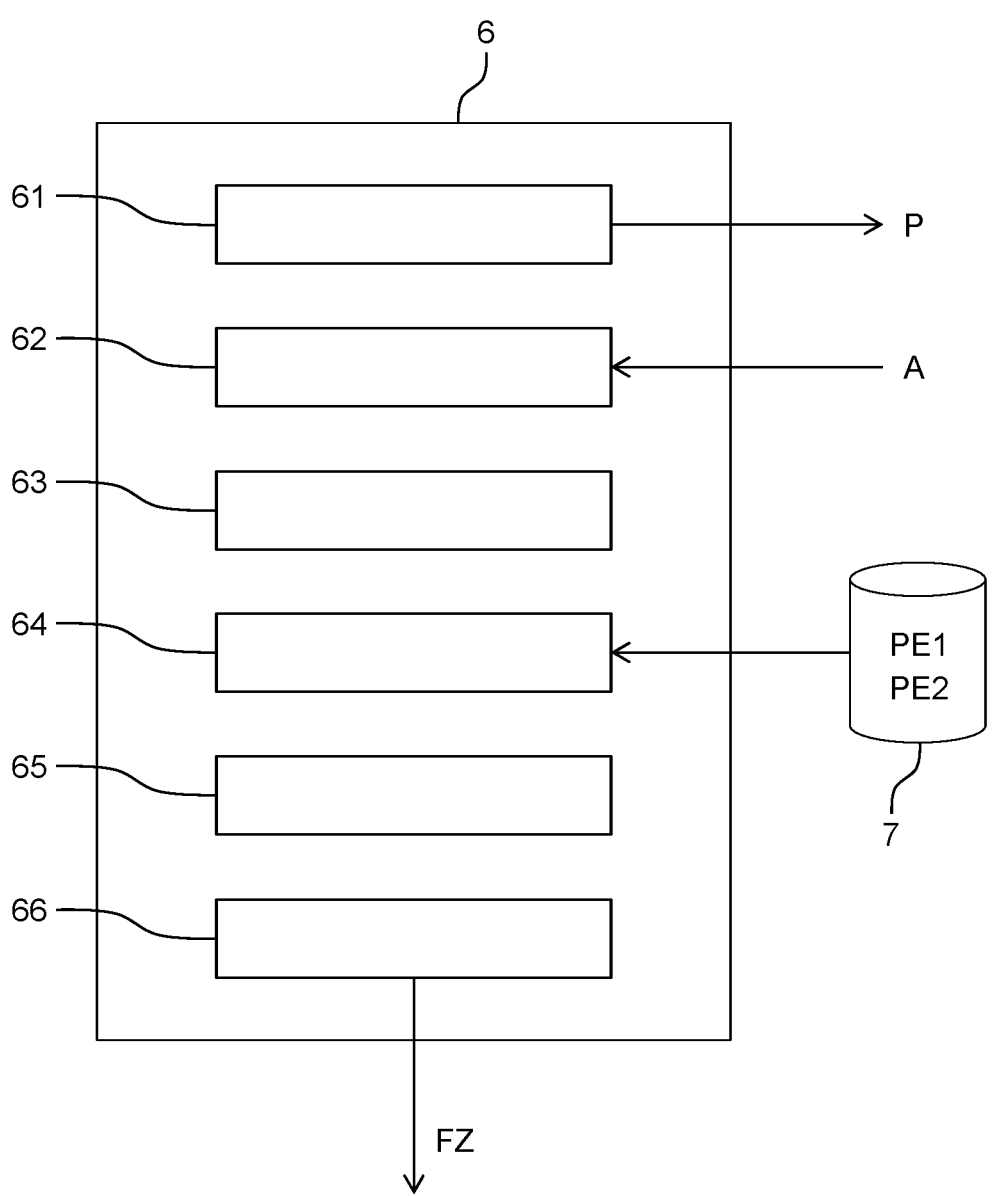
FIG. 2 shows a device used in the vehicle.
Figure 3:
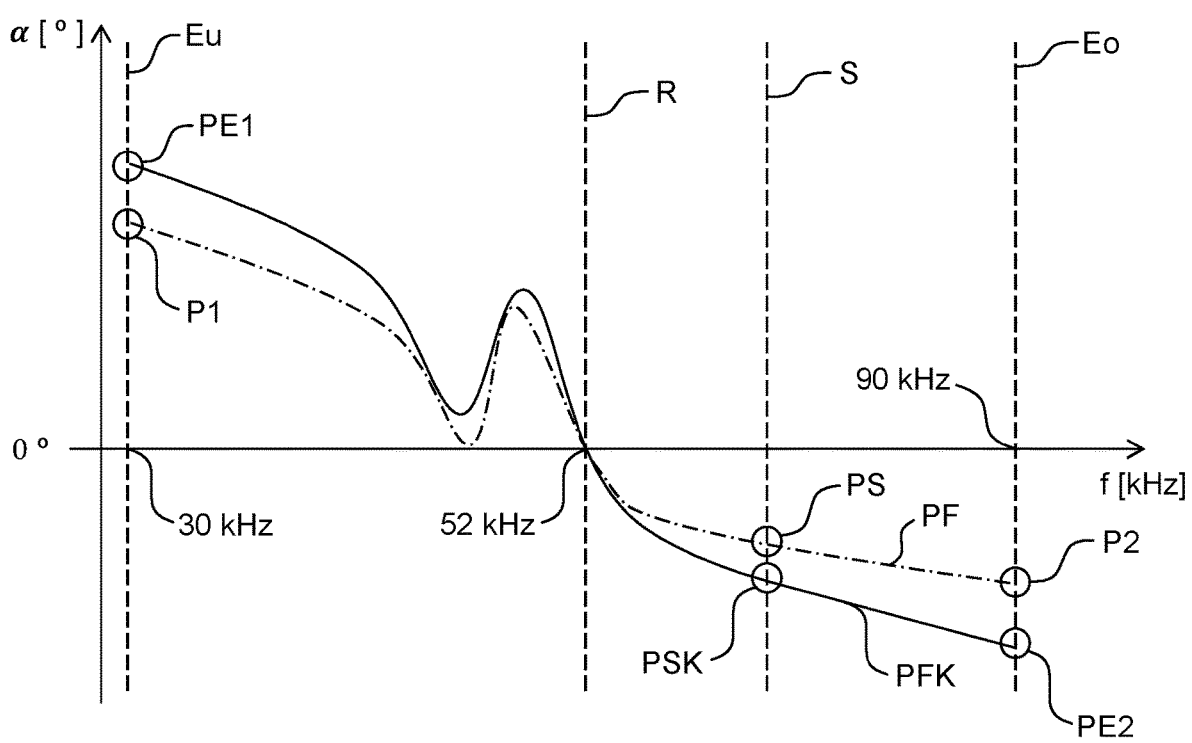
FIG. 3 shows a phase-frequency response in accordance with one embodiment.

Furthermore, the device 6 has a determining unit 66 (FIG. 2). This is designed to output the functional state FZ (FIG. 2) based on the corrected phase-frequency response PFK (method step S6 in FIG. 5). For example, the functional state may be "sensor affected by ice". Or, the functional state consists in one or more correction values or similar and is used in the operation of the ultrasonic sensor 2 or the vehicle 1 to correct the distance data detected by the ultrasonic sensor 2.

In particular, it is provided that parameters of a state model 8 shown in FIG. 4—here an equivalent circuit diagram—of the ultrasonic sensor 2 are determined. These are compared with expected parameters. In the exemplary embodiment, the state model 8 comprises a capacitor C1, an inductor I1 and a resistor R1, which are connected in series with each other with respect to the test signal P. Furthermore, the state model 8 comprises a capacitor C2, an inductor I2 and a resistor R2, which are connected in parallel with each other with respect to the test signal P. The determining unit 66 then determines the parameters C1, C2, I1, I2, R1 and R2 in such a way that the corrected phase frequency response PFK is obtained for the model. In a further step, the determined parameters C1, C2, I1, I2, R1 and R2 are compared with expected parameters C1', C2', I1', I2', R1' and R2'. Depending on the result of the comparison, the functional state FZ is determined. For example, the expected parameters C1', C2', I1', I2', R1' and R2' correspond to the ice-affected state of the ultrasonic sensor 2. For example, the expected parameters C1', C2', I1', I2', R1' and R2' can be calculated using a CAD or other simulation model or measured in a trial using a reference sensor. This is preferably carried out at the development stage of the ultrasonic sensor 2, or at least before its initial operation in the vehicle 1 for distance measurement.

Preferably, the vehicle 1 comprises a temperature sensor 9, which detects the temperature T of the vehicle environment 10. The detected temperature T is preferably used by the determining unit 66 to further correct the determined parameters C1, C2, I1, I2, R1 and R2. This correction can be performed, for example, using a look-up table or a conversion table. The subsequent comparison with the expected parameters C1', C2', I1', I2', R1' and R2' then allows an even better determination of the functional state FZ.

Although the present invention has been described on the basis of exemplary embodiments, it may be modified in many ways.

LIST OF REFERENCE SIGNS

1 vehicle
2 ultrasonic sensor
3 object
4 ultrasonic waves
5 vehicle control unit
6 device
61 excitation unit
62 detection unit
63 determining unit
64 comparison unit
65 correction unit
66 determining unit
7 data memory
8 state model
9 temperature sensor
10 vehicle environment
A response signal
C1, C2 capacitors
Eu, Eo extreme frequencies
f frequency
FZ functional state
I1, I2 inductors
P test signal
P1, P2 phase angle
PE1 expected phase angle
PE2 expected phase angle
PF phase-frequency response
PFK corrected phase-frequency response
PS phase angle of sampling point
PSK corrected phase angle of sampling point
R resonance frequency R1, R2 resistors
S sampling point
T temperature
α angle

The invention claimed is:

1. A method for determining a functional state of an ultrasonic sensor for a vehicle,
the method comprising:
applying an electrical test signal to the ultrasonic sensor;
detecting an electrical response signal from the ultrasonic sensor;
determining a phase-frequency response comprising the phase angle of the detected response signal for the applied test signal as a function of an excitation frequency of the applied test signal;
comparing at least a first phase angle below and a second phase angle above a resonant frequency in the determined phase-frequency response with a respective expected phase angle;
correcting the determined phase-frequency response on the basis of the comparison; and
determining the functional state on the basis of the corrected phase-frequency response and a detected temperature of the ultrasonic sensor or a vehicle environment,
wherein the ultrasonic sensor is operated in accordance with the determined functional state, and
wherein the method is carried out at an end of a production line in which the vehicle comprising the ultrasonic sensor is manufactured, and at or immediately after each starting of the vehicle.

2. The method as claimed in claim 1,
wherein the first and second phase angles are spaced from the resonance frequency by at least 20% of the resonance frequency.

3. The method as claimed in claim 1,
wherein the first and second phase angles of the determined phase-frequency response are corrected to the respective expected phase angle.

4. The method as claimed in claim 1,
wherein the correction of the determined phase-frequency response occurs at sampling points between the first and second phase angle.

5. The method as claimed in claim 4,
wherein the correction applied at the first and second phase angle or the sampling points is affine-linear.

6. The method as claimed in claim 1,
wherein parameters of a state model of the ultrasonic sensor are determined on the basis of the corrected phase-frequency response, and
wherein the functional state is determined on the basis of a comparison of the determined parameters with the expected parameters.

7. The method as claimed in claim 6,
wherein the state model comprises:
a first capacitor, a first inductor and a first resistor, which are connected in series with each other, and
a second capacitor, a second inductor and a second resistor, which are connected in parallel.

8. The method as claimed in claim 7, wherein the determining of the functional state comprises:
correcting the determined parameters of the first capacitor, the first inductor, the first resistor, the second capacitor, the second inductor and the second resistor based on the detected temperature, and
comparing the corrected determined parameters with the expected parameters.

9. The method as claimed in claim 1,
wherein the respective expected phase angle and the expected parameters are determined using a simulation model or reference sensor.

10. The method as claimed in claim 1,
wherein correcting the phase-frequency response is carried out without the use of an amplitude-frequency response.

11. The method as claimed in claim 1, wherein the comparing is comparing the first phase angle below and the second phase angle above a resonant frequency in the determined phase-frequency response with the respective expected phase angle.

12. A device for determining a functional state of an ultrasonic sensor for a vehicle having the device,
the device comprising:
an excitation unit for applying an electrical test signal to the ultrasonic sensor;
a detection unit for detecting an electrical response signal from the ultrasonic sensor;
a determining unit for determining a phase-frequency response,
wherein the phase-frequency response comprises the phase angle of the detected response signal for the applied test signal as a function of an excitation frequency of the applied test signal;
a comparison unit for comparing at least a first phase angle below and a second phase angle above a resonant frequency in the determined phase-frequency response with a respective expected phase angle;
a correction unit for correcting the determined phase-frequency response using the comparison; and
a determining unit for determining the functional state on the basis of the corrected phase-frequency response and a detected temperature of the ultrasonic sensor or a vehicle environment,
wherein the ultrasonic sensor is operated in accordance with the determined functional state, and
wherein the applying, the detecting the electrical response signal, the determining the phase-frequency response, the comparing, the correcting and the determining the functional state are carried out at an end of a production line in which the vehicle comprising the ultrasonic sensor is manufactured, and at or immediately after each starting of the vehicle.

13. A non-transitory computer readable medium storing instructions on a memory coupled to a processor, the instructions comprising functionality for:
applying an electrical test signal to the ultrasonic sensor;
detecting an electrical response signal from the ultrasonic sensor;
determining a phase-frequency response comprising the phase angle of the detected response signal for the applied test signal as a function of an excitation frequency of the applied test signal;
comparing at least a first phase angle below and a second phase angle above a resonant frequency in the determined phase-frequency response with a respective expected phase angle;
correcting the determined phase-frequency response on the basis of the comparison; and
determining the functional state on the basis of the corrected phase-frequency response and a detected temperature of the ultrasonic sensor or a vehicle environment,
wherein the ultrasonic sensor is operated in accordance with the determined functional state, and
wherein the instructions are configured to be carried out at an end of a production line in which the vehicle comprising the ultrasonic sensor is manufactured, and at or immediately after each starting of the vehicle.

* * * * *